(12) United States Patent
Bricca et al.

(10) Patent No.: US 12,190,322 B1
(45) Date of Patent: Jan. 7, 2025

(54) AGGREGATION VIA RESOURCE LOCATOR AND DATA CHARACTERISTICS

(71) Applicant: Block, Inc., Oakland, CA (US)

(72) Inventors: Gregory Bricca, Corte Madera, CA (US); Jesse Wilson, Waterloo, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/406,042

(22) Filed: Jan. 5, 2024

Related U.S. Application Data

(63) Continuation of application No. 17/674,541, filed on Feb. 17, 2022, now abandoned, which is a continuation of application No. 15/941,909, filed on Mar. 30, 2018, now abandoned.

(51) Int. Cl.
  *G06Q 20/40* (2012.01)
  *G06Q 20/20* (2012.01)

(52) U.S. Cl.
  CPC ....... *G06Q 20/4014* (2013.01); *G06Q 20/202* (2013.01)

(58) Field of Classification Search
  None
  See application file for complete search history.

(56) References Cited

U.S. PATENT DOCUMENTS

| | | |
|---|---|---|
| 5,999,941 A | 12/1999 | Andersen |
| 6,786,400 B1 | 9/2004 | Bucci |
| 7,249,093 B1 | 7/2007 | King |
| 7,552,087 B2 | 6/2009 | Schultz et al. |
| 8,260,694 B1 | 9/2012 | Lauer et al. |
| 8,612,317 B1 | 12/2013 | Harman et al. |
| 8,706,557 B1* | 4/2014 | Tavares ................ G06Q 20/204 705/16 |
| 9,811,810 B1 | 11/2017 | Ranganath et al. |
| 9,875,385 B1 | 1/2018 | Humphreys et al. |
| 10,460,306 B1* | 10/2019 | Ramos ................. G06Q 20/405 |
| 10,467,601 B1 | 11/2019 | Bricca et al. |
| 2002/0091991 A1* | 7/2002 | Castro ........................ G06F 9/06 717/106 |
| 2006/0242026 A1* | 10/2006 | Crespo .................... G06Q 40/04 705/26.8 |
| 2007/0050258 A1 | 3/2007 | Dohse |
| 2011/0251892 A1 | 10/2011 | Laracey |
| 2012/0084135 A1 | 4/2012 | Nissan et al. |
| 2012/0253913 A1 | 10/2012 | Richard |

(Continued)

*Primary Examiner* — Fateh M Obaid
(74) *Attorney, Agent, or Firm* — Lee & Hayes, P.C.

(57) ABSTRACT

Computer-implemented methods and systems for using a resource locator and customer identifier to identify transactions associated with certain characteristics. An example method comprises monitoring transaction data and storing it within a database. Transaction data associated with a customer is stored at a storage location within the database, and the storage location is associated with an identifier and accessible via a resource locator. A request is received that is associated with purchase activity of the customer and specifies a time period and transaction characteristics(s). It is determined that that the request is associated with the identifier. Based at least in part on the identifier and the transaction data associated with the customer, transaction(s) of the customer occurring within the time period and including the characteristic(s) are identified.

20 Claims, 12 Drawing Sheets

(56) References Cited

U.S. PATENT DOCUMENTS

| | | | |
|---|---|---|---|
| 2012/0290609 A1 | 11/2012 | Britt | |
| 2013/0073859 A1* | 3/2013 | Carlson | H04L 9/3247 |
| | | | 713/176 |
| 2014/0019236 A1 | 1/2014 | Argue et al. | |
| 2014/0058861 A1 | 2/2014 | Argue et al. | |
| 2014/0114857 A1 | 4/2014 | Griggs et al. | |
| 2014/0229305 A1 | 8/2014 | Ellan | |
| 2014/0279106 A1 | 9/2014 | Smelcer | |
| 2014/0337175 A1 | 11/2014 | Katzin et al. | |
| 2015/0046307 A1 | 2/2015 | Calman et al. | |
| 2015/0106243 A1 | 4/2015 | Blackhurst et al. | |
| 2015/0178712 A1 | 6/2015 | Angrish et al. | |
| 2015/0213426 A1 | 7/2015 | Singhal | |
| 2015/0332223 A1 | 11/2015 | Aaron et al. | |
| 2015/0356556 A1* | 12/2015 | Celikyilmaz | G06Q 20/3224 |
| | | | 705/14.51 |
| 2016/0321705 A1 | 11/2016 | Scheidelman | |
| 2017/0300917 A1* | 10/2017 | Tavares | G06Q 20/385 |
| 2018/0167492 A1* | 6/2018 | Bonig | H04L 67/10 |
| 2020/0342429 A1 | 10/2020 | Lamba et al. | |
| 2022/0172179 A1 | 6/2022 | Bricca et al. | |
| 2022/0179665 A1* | 6/2022 | Rathod | G06F 9/451 |
| 2023/0214925 A1* | 7/2023 | Cella | G06Q 30/06 |
| | | | 705/37 |

\* cited by examiner

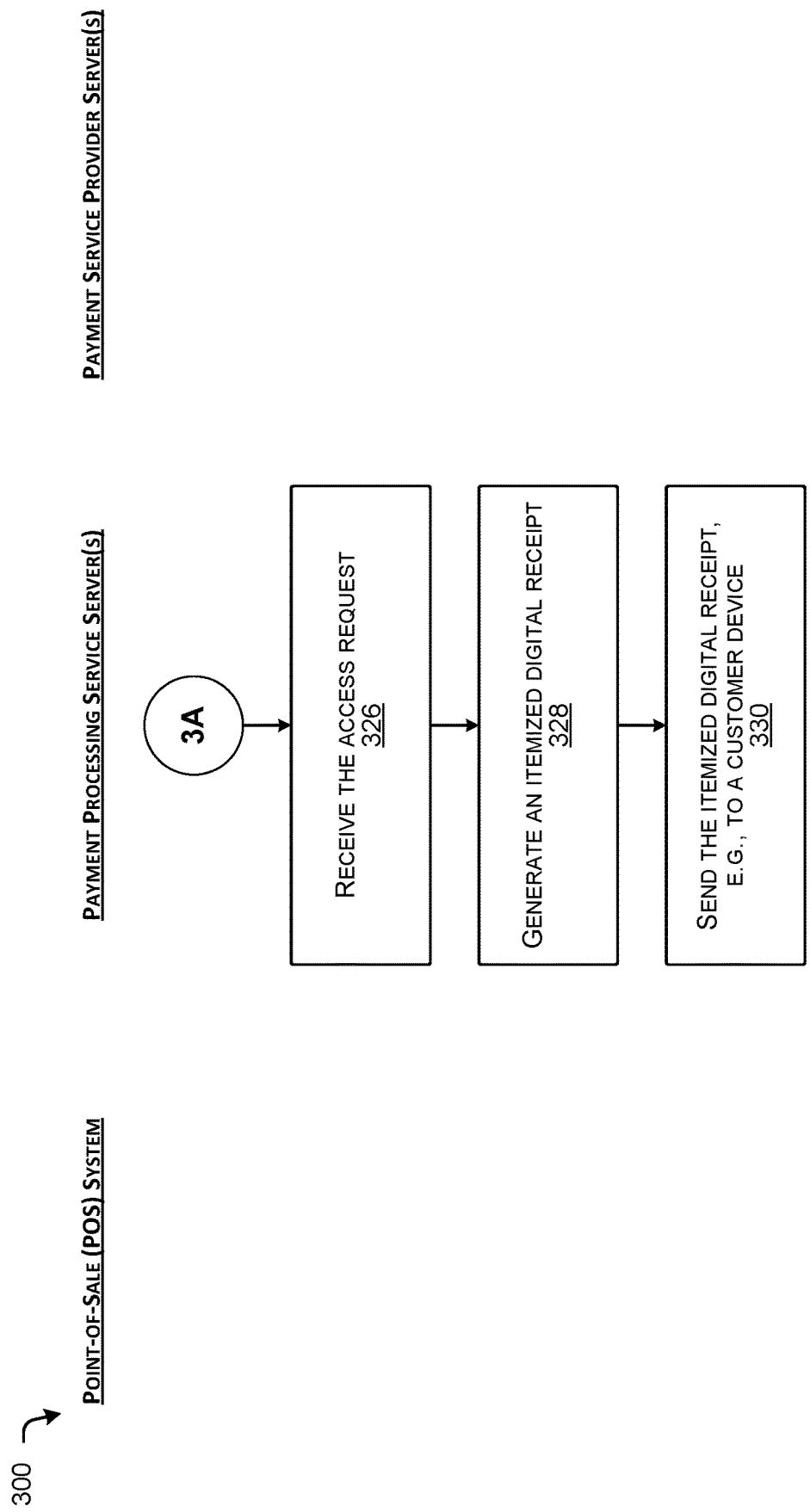

AGGREGATION VIA RESOURCE LOCATOR AND DATA CHARACTERISTICS

RELATED APPLICATIONS

This application is a continuation of and claims priority to U.S. patent application Ser. No. 17/674,541, filed Feb. 17, 2022, which is a continuation of and claims priority to U.S. patent application Ser. No. 15/941,909, filed Mar. 30, 2018.

BACKGROUND

Receipts are sometimes used to provide information to customers about their purchases. As an example, a merchant may provide a customer a paper receipt at the merchant's brick-and-mortar store. The paper receipt may provide a limited amount of information, and in a static format, about a transaction between the customer and the merchant. As another example, a customer may receive a digital receipt (e.g., from a merchant, a payment service such as a card network, etc.) that may provide a limited amount of information about a transaction between the customer and the merchant. For instance, the digital receipt may provide a total amount of the cost of the transaction, without providing any indication of cost per item. Furthermore, the digital receipt may be provided in a static format, much like the paper receipt.

BRIEF DESCRIPTION OF THE DRAWINGS

The above and other features of the present disclosure, its nature and various advantages will be more apparent upon consideration of the following detailed description, taken in conjunction with the accompanying drawings in which:

FIGS. 3A-3B depict a non-limiting flow diagram illustrating an example method for providing itemized digital receipts, in accordance with some implementations.

Figure 1:
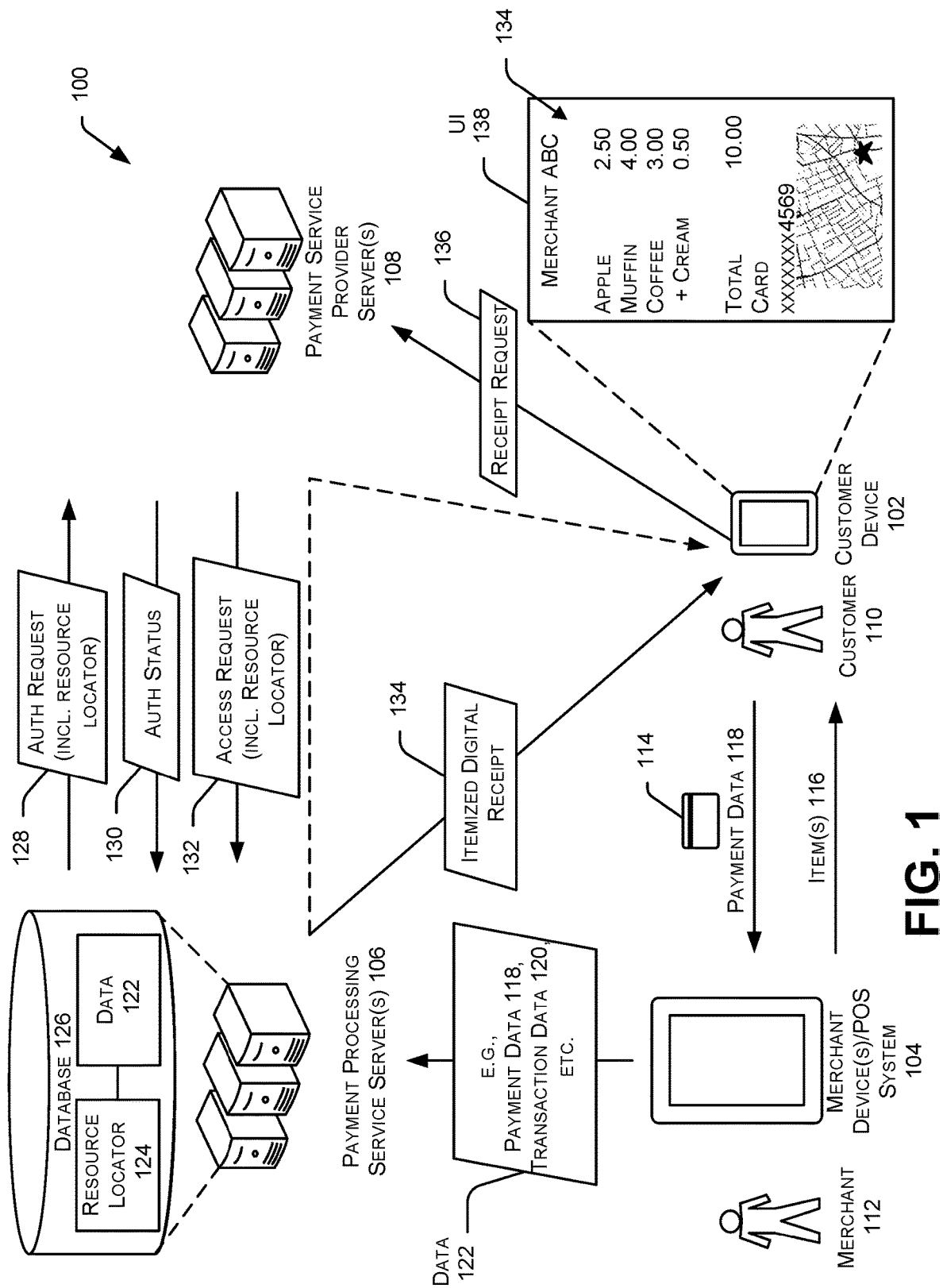
FIG. 1 depicts a schematic diagram illustrating an example scenario in which an itemized digital receipt is provided to a customer device, in accordance with some implementations.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

This disclosure describes, in part, systems and techniques for providing digital receipts and/or customized digital item listings that may include itemized, interactive, and/or modifiable information about a transaction, such as a purchase transaction between a customer and a merchant. In various examples, a resource locator (e.g., a URL) may be associated with transaction data and/or payment data. Furthermore, the resource locator may be associated with a storage location at which the transaction data and/or the payment data may be stored. The resource locator may be used by multiple entities (e.g., a customer, a merchant, a payment processing service, and/or a payment service provider, etc.) for communications regarding the transaction data and/or the payment data. In at least one example, the resource locator can be utilized to recall at least a portion of the transaction data and/or payment data via an itemized digital receipt. As will be discussed in further detail below, in various instances, instead of transmitting receipt data (which may include, e.g., a significant amount of item-level information) from one computing system to another (e.g., between entities), the resource locator may be transmitted between the various computing systems. As such, the techniques described herein may enable the provision of itemized digital receipts while reducing the amount of data transmitted between computing systems, thereby reducing bandwidth consumption and/or network congestion.

In a non-limiting example, a customer may purchase a t-shirt and a pair of jeans from a merchant using a payment instrument (e.g., a credit card). A resource locator may be generated in association with the transaction. In some instances, a merchant device of the merchant may generate the resource locator (e.g., an application executable by the merchant device may generate the resource locator). In other instances, a payment processing service server configured to process transactions of the merchant may generate the resource locator. Data corresponding to the transaction, such as transaction data and/or payment data, may be stored in a storage location associated with the resource locator. The resource locator may enable access retrieval of the transaction data and/or the payment data. The resource locator may be passed along from the merchant device to the payment processing service server, and/or from the payment processing service server to a payment service provider server (e.g., a card network). For instance, the resource locator may be passed along via an authorization request to authorize the payment instrument for the cost of the transaction. In some examples, the resource locator may be embedded as metadata in the authorization request.

The customer may want to view an itemized digital receipt for the transaction. The customer may operate a customer device to request the itemized digital receipt. The resource locator may be passed along between computing devices of different entities, e.g., via one or more requests that may ultimately reach the computing device of the entity storing the data corresponding to the transaction in the storage location associated with the resource locator. For instance, the payment processing service server may receive a request that includes the resource locator, and may serve an itemized digital receipt to the customer device. The itemized digital receipt may include item-level information associated with the transaction. For instance, the itemized digital receipt may indicate that the customer purchased the t-shirt and the pair of jeans, along with the price of each of those items. As discussed in further detail below, the itemized digital receipt may provide various other item-level information. In some examples, the itemized digital receipt may be operable to enable the customer to interact with individual items in the itemized digital receipt. Furthermore, the itemized digital receipt may enable the customer to interact with the itemized digital receipt to, e.g., dispute a charge, provide feedback, provide loyalty information, and/or add or modify a gratuity, etc.

In various instances, instead of transmitting receipt data, transaction data, payment data, and/or item-level information from one computing system to another, the resource locator may be transmitted between the various computing systems. In this manner, the techniques described herein may enable the provision of itemized digital receipts while reducing the amount of data transmitted between computing systems, thereby reducing bandwidth consumption and/or network congestion. Furthermore, the present examples enable payment systems with the additional functionality of recalling item-level transaction details via a payment service, which current systems are unable to provide.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts a schematic diagram illustrating an example scenario 100 in which an itemized digital receipt is provided to a customer device, in accordance with some implementations. In some examples, the scenario 100 may include one or multiple features, components, and/or functionality of implementations described herein with reference to FIGS. 2-11.

In some examples, the scenario 100 may include a customer device 102, a merchant device 104, payment processing service server(s) 106, and/or payment service provider server(s) 108. The customer device 102 may be operated by a customer 110. The merchant device 104 may be operated by a merchant 112 (e.g., an employee of the merchant 112). The payment processing service server(s) 106 may be part of a payment processing service that, among other things, processes transactions between merchants and customers. The payment service provider server(s) 108 may be part of a payment service provider (e.g., a card network, a bank, etc.) that, among other things, may issue payment instruments and/or process authorization requests with respect to payment instruments.

According to various examples, the customer 110 may engage in a transaction (e.g., a purchase transaction, an electronic payment transaction, etc.) with the merchant 112. As a non-limiting example, the customer 110 may use a payment instrument 114 to buy item(s) 116 such as an apple, a muffin, and a coffee from the merchant 112. The payment instrument 114 may include a credit card having a magnetic stripe, an EMV chip card, and/or a short-range communication enabled electronic device such as a smart phone running a payment application, etc. In some implementations, the merchant device(s) 104 may function as a point-of-sale (POS) system 104 that is capable of processing, for example, payment data 118 (e.g., encrypted payment card data and user authentication data) and transaction data (e.g., purchase amount, point-of-purchase information, item-level information, etc.). The POS system 104 may include a payment reader device and a POS terminal in some examples. The payment reader device may be configured to detect and obtain data from payment instruments. The POS terminal may have a POS application executing thereon.

In some examples (e.g., for low-value transactions or for payment transactions that are less than a payment limit indicated by a payment instrument), the initial processing and approval of the payment transaction may be processed at the POS system 104. In other examples, the POS system 104 may communicate with the payment processing service server(s) 106, which may communicate with payment service provider server(s) 108, over one or more networks. The POS system 104, the payment processing service server(s) 106, and/or the payment service provider server(s) 108 may communicate payment data 118 and/or transaction data 120 to determine whether a payment instrument is authorized for a cost of a transaction.

For instance, the POS system 104 may obtain payment data 118 from the payment instrument 114 and/or the customer device 102. The POS system 104 may send data 122 associated with the transaction to the payment processing service server(s) 106. In some implementations, the data 122 may include the payment data 118 and/or the transaction data 120. According to some examples, the POS system 104 may send an authorization request to the payment processing service server(s) 106. Some or all of the data 122 may be sent to the payment processing service server(s) 106 as part of the authorization request in some instances.

In some cases, the POS system 104 may send the payment data 118 and/or the transaction data 120 as part of an authorization request sent to the payment processing service server(s) 106 to determine whether the payment instrument 114 is authorized for the cost of the transaction. In various implementations, the payment processing service server(s) 106 may generate a resource locator 124 (e.g., a unique resource locator (URL)). In some cases, the resource locator 124 may be associated with the payment data 118, the transaction data 120, the merchant 112 (and/or the merchant device(s) 104), and/or the customer 110 (and/or the customer device 102). The resource locator 124 may be stored by the payment processing service server(s) 106. Furthermore, the resource locator 124 may enable access retrieval of the payment data 118 and/or the transaction data 120.

According to various examples, the payment processing service server(s) 106 may store the resource locator 124, the payment data 118, and/or the transaction data 120 in one or more databases. For instance, the payment processing service server(s) 106 may store the data 122 received from the POS system 104 in a particular storage location among multiple storage locations in database 126. The particular storage location may be associated with the resource locator 124, such that the resource locator 124 may be used to access the data 122 stored in the particular storage location. In various implementations, the resource locator 124 may be associated with one or more particular storage locations at which payment data and/or transaction data received from a particular merchant and/or a particular customer may be stored.

In some examples, the payment processing service server(s) 106 may send an authorization request 128 to the payment service provider server(s) 108 to determine whether the payment instrument 114 is authorized for the cost of the transaction. In some examples, the authorization request 128 may include the payment data 118 and/or the resource locator 124. For instance, the resource locator 124 may be embedded as metadata in the authorization request 128. In a non-limiting example, the resource locator 124 may be a short URL embedded in the authorization request 128, e.g., in an extension field such as one for a merchant street address. In response to receiving the authorization request 128, the payment service provider server(s) 108 may send the payment processing service server(s) 106 an authorization status 130 indicating, for instance, whether the payment instrument is authorized or declined. Additionally, or alternatively, the payment service provider server(s) 108 may be configured to look for the resource locator 124 in the incoming authorization request 128 in some implementations. The payment service provider server(s) 108 may use the resource locator 124 to request access to the data 122 (e.g., by sending, to the payment processing service server(s) 106, an access request 132 that includes or is otherwise associated with the resource locator 124), e.g., to enable provision of an itemized digital receipt 134 based at least in part on the transaction data 120.

In some instances, the payment service provider server(s) 108 may send the access request 132 to the payment processing service server(s) 106 at least partly responsive to receiving the authorization request 128. Additionally, or alternatively, the payment service provider server(s) 108 may store the resource locator 124 for later use. For instance, the payment service provider server(s) may send the access request 132 to the payment processing service server(s) 106 at least partly responsive to receiving a receipt request 136, e.g., from the customer device 102 of the customer 110.

In some examples, the payment processing service server(s) 106 may generate an itemized digital receipt 134 at least partly responsive to receiving an access request 132 from the payment service provider server(s) 108. The payment processing service server(s) 106 may identify the resource locator 124 based at least in part on the access request 132. As an example, the access request 132 may include the resource locator 124. As another example, the access request 132 may provide an indication of the resource locator 124 that enables the payment processing service server(s) to identify the resource locator 124. The payment processing service server(s) 106 may use the resource locator 124 to locate and/or obtain at least some of the data 122. For instance, the payment processing service server(s) 106 may obtain, using the resource locator 124, at least some of the transaction data 120 to produce the itemized digital receipt 134.

In some implementations, the payment processing service server(s) 106 may serve the itemized digital receipt 134 to the customer device 102. For instance, the itemized digital receipt 134 may be sent to the customer device in a data format, e.g., a human-readable data format such a JavaScript Object Notation (JSON) document. The customer device 102 may receive the itemized digital receipt 134 and present (e.g., on a display of the customer device 102) a user interface 138 (UI) that provides a visual representation of the itemized digital receipt 134.

According to some examples, the itemized digital receipt 134 may be operable to enable the customer 110 to view item-level information of the transaction between the customer 110 and the merchant 112. For instance, in the non-limiting example shown in FIG. 1, the itemized digital receipt 134 that is presented via the UI 138 indicates that the customer 110 purchased, from Merchant ABC: an apple for $2.50, a muffin for $4.00, and a coffee for $3.00 (with cream added for an additional $0.50). The itemized digital receipt 134 also indicates, via map information, a location of Merchant ABC. In this example, the merchant name, the item names, the item prices, the total cost, the card information, and/or the location information may be considered item-level information. It should be understood that this example is not intended to provide an exhaustive list of types of item-level information-any other suitable type of item-level information may be provided in the itemized digital receipt 134.

In some examples, the itemized digital receipt 134 may be operable to enable the customer 110 to interact with individual items in the itemized digital receipt 134. For instance, the customer 110 may interact with item-level information in the itemized digital receipt 134 via the UI 138. In some non-limiting examples, the itemized digital receipt 134 may enable the customer 110 to interact with the itemized digital receipt 134 to dispute a charge, provide feedback, provide loyalty information, and/or add or modify a gratuity, etc.

As indicated above, in some instances the payment processing service server(s) 106 may send the itemized digital receipt 134 directly to the customer device 102. In other instances, however, the itemized digital receipt 134 may be provided to the customer device 102 via the payment service provider server(s) 108. For instance, the payment processing service server(s) 106 may send the itemized digital receipt 134 to the payment service provider server(s) 108, and the payment service provider server(s) 108 may send the itemized digital receipt 134 to the customer device 102.

In some cases, the payment processing service server(s) 106 may provide the itemized digital receipt 134 at least partly responsive to receiving an access request 132 from the payment service provider server(s) 108. While not indicated in FIG. 1, it should be understood that the payment processing service server(s) 106 may provide the itemized digital receipt 134 at least partly responsive to receiving a receipt request 136 from the customer device 102. As a non-limiting example, the customer device 102 may have an electronic payment application executing thereon. In some cases, the electronic payment application may be provided by the payment processing service. In other cases, the electronic payment application may be provided by the payment service provider. The electronic payment application may enable the customer 110 to request receipts (e.g., itemized digital receipt 134) from the payment service provider server(s) 108, the payment processing service server(s) 106, and/or the merchant device(s) 104. In some non-limiting examples, the customer 110 may use the customer device 102 to request receipts via, e.g., a web browser, e-mail, text message, etc.

As described above, the resource locator 124 may be associated with the data 112. In some implementations, the merchant device(s) 104 may generate the resource locator 124 in association with the data 122 from the transaction. In such cases, the merchant device(s) 104 may send an authorization request to the payment processing service server(s) 106 and/or the payment service provider server(s) 108 to authorize the payment instrument 114 for the cost of the transaction. The authorization request may be associated with the resource locator 124. In some cases, the authorization request may include the resource locator 124. For instance, the resource locator 124 may be embedded as metadata in the authorization request. The merchant device(s) 104 may store the data 122 in a storage location associated with the resource locator 124, such that the merchant device(s) 104 can use the resource locator 124 to retrieve the data 122 from the storage location. Or, the payment processing service server(s) 106 may store the data 112 in the database 126, and associate the data 112 with the resource locator 124 received from the merchant device 104.

Figure 2:
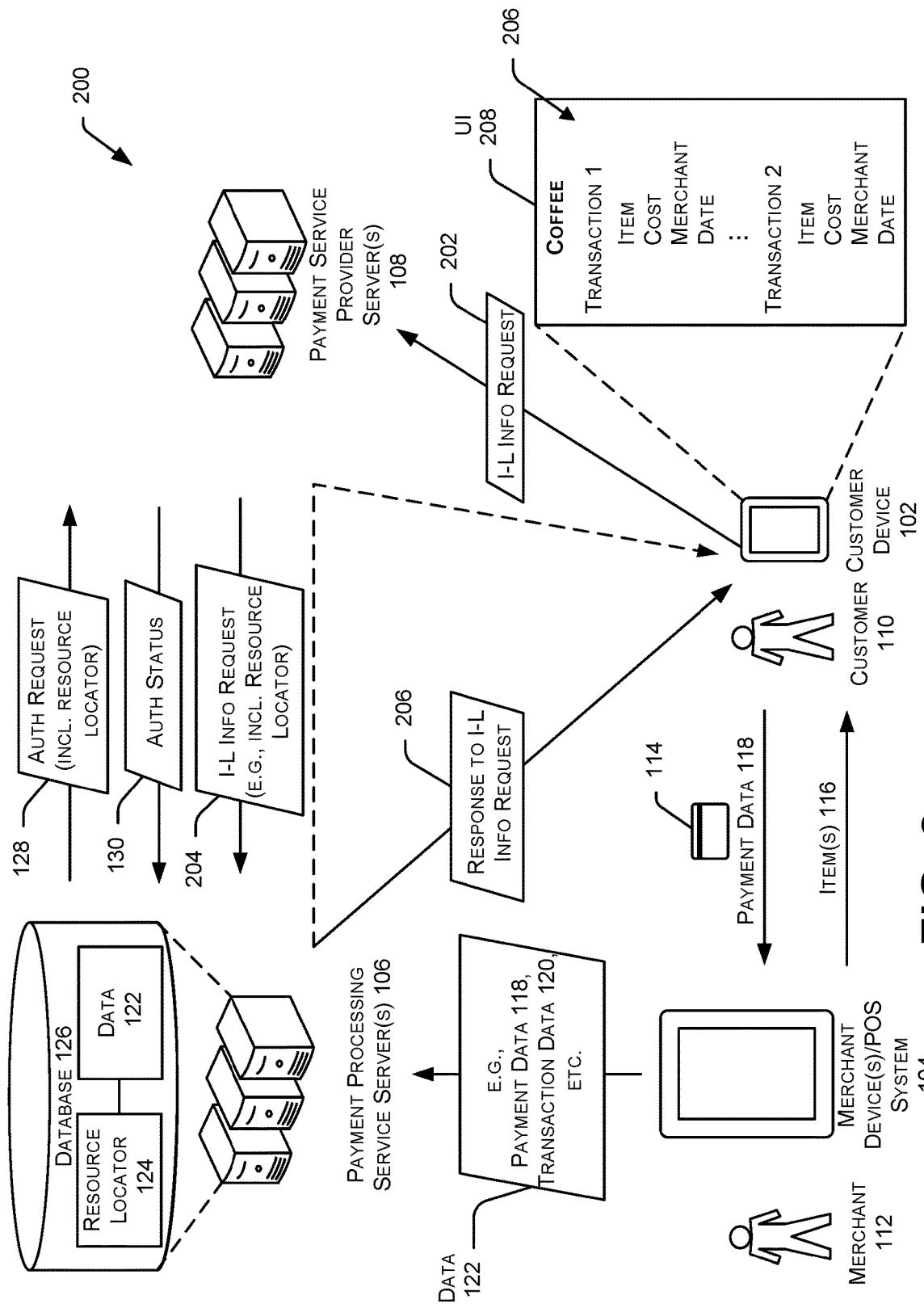
FIG. 2 depicts a schematic diagram illustrating an example scenario in which item-level information from one or more transactions is analyzed and provided to a customer device, in accordance with some implementations.

FIG. 2 depicts a schematic diagram illustrating an example scenario 200 in which item-level information from one or more transactions is analyzed and provided to a customer device, in accordance with some implementations. In some examples, the scenario 200 may include one or multiple features, components, and/or functionality of implementations described herein with reference to FIGS. 1 and 3A-11.

In some examples, the scenario 200 may include the customer device 102, the merchant device 104, the payment processing service server(s) 106, and/or the payment service provider server(s) 108 of FIG. 1. In scenario 200, however, the customer device 102 and/or the payment service provider server(s) 108 may send an item-level information request to the payment processing service server(s) 106. In some examples, the item-level information request may be associated with one or more resource locators (e.g., the resource locator 124 and/or one or more other resource locators) that can be used to identify and retrieve data (e.g., transaction data) associated with the customer. Additionally, or alternatively, the item-level information request may be associated with one or more identifier(s) (e.g., a customer identifier) that can be used to identify and retrieve the data associated with the customer. In various instances, the resource locator(s) and/or the identifier(s) may be associated with one or more storage locations at which transaction data of the customer is stored. The payment processing service server(s) 106 may analyze the data stored in the storage location(s) to return item-level information that is responsive to the item-level information request, e.g., in the form of an itemized digital receipt and/or a customized digital item listing (e.g., a customized digital receipt).

In some instances, the customer device 102 may send an item-level information request 202 to the payment service provider server(s) 108. Furthermore, the payment service provider server(s) 108 may send an item-level information request 204 to the payment processing service server(s) 106. The item-level information request 204 may be associated with one or more resource locators and/or one or more identifiers. In some examples, the item-level information request 204 may include, or may be otherwise associated with, the resource locator(s) and/or the identifier(s). For instance, the resource locator(s) and/or the identifier(s) may be embedded as metadata in the item-level information request 204.

According to some examples, the payment processing service server(s) 106 may receive the item-level information request 204 and use the resource locator(s) and/or the identifier(s) to access the data 122 stored in a storage location that is associated with the resource locator(s) and/or the identifier(s). In some non-limiting examples, the storage location associated may include data from multiple different transactions. The payment processing service server(s) 106 may analyze the data stored in the storage location based at least in part on the item-level information request 204.

In a non-limiting example, the customer 110 may want to receive item-level information pertaining to coffee purchases. The customer 110 may use the customer device 102 to send (e.g., to the payment service provider server(s) 108) the item-level information request 202 indicating that the customer would like an analysis of transaction data relevant to coffee. The payment service provider server(s) 108 may send (e.g., to the payment processing service server(s) 106) the item-level information request 204 based at least in part on the item-level information request 202 received from the customer device 102. The payment processing service server(s) 106 may analyze the data 122, with respect to coffee, to return the response to the item-level information request 206. According to some examples, to generate the response to the item-level information request 202, the payment processing service server(s) 106 may generate, based at least in part on an analysis of the transaction data, a customized digital item listing (e.g., a customized digital receipt) that includes item-level information that is responsive to the item-level information request 202. In some implementations, the payment processing service server(s) 106 may serve the response 206 to the customer device 102. For instance, the response 206 may be sent to the customer device in a data format, e.g., a human-readable data format such a JavaScript Object Notation (JSON) document. The customer device 102 may receive the response 206 and present (e.g., on a display of the customer device 102) a user interface (UI) 200 that provides a visual representation of the response 206. In this non-limiting example, the response 206 may indicate, e.g., that coffee was purchased in two different transactions—Transaction 1 and Transaction 2. In some instances, Transaction 1 and Transaction 2 may be transactions that the customer 110 engaged with different merchants. For each of these transactions, the response 206 may provide item-level information associated with the respective item, the respective cost, the respective merchant, the respective date, etc. It should be understood that this example is not intended to provide an exhaustive list of types of item-level information-any other suitable type of item-level information may be provided in the itemized digital receipt 134.

In some examples, the response 206 may be operable to enable the customer 110 to interact with individual items in the response 206. For instance, the customer 110 may interact with item-level information in the response 206 via the UI 208. In some non-limiting examples, the response 206 may enable the customer 110 to interact with the response 206 to dispute a charge, provide feedback, provide loyalty information, and/or add or modify a gratuity, etc.

As indicated above, in some instances the payment processing service server(s) 106 may send the response 206 directly to the customer device 102. In other instances, however, the response 206 may be provided to the customer device 102 via the payment service provider server(s) 108. For instance, the payment processing service server(s) 106 may send the response 206 to the payment service provider server(s) 108, and the payment service provider server(s) 108 may send the response 206 to the customer device 102.

Figure 3A:
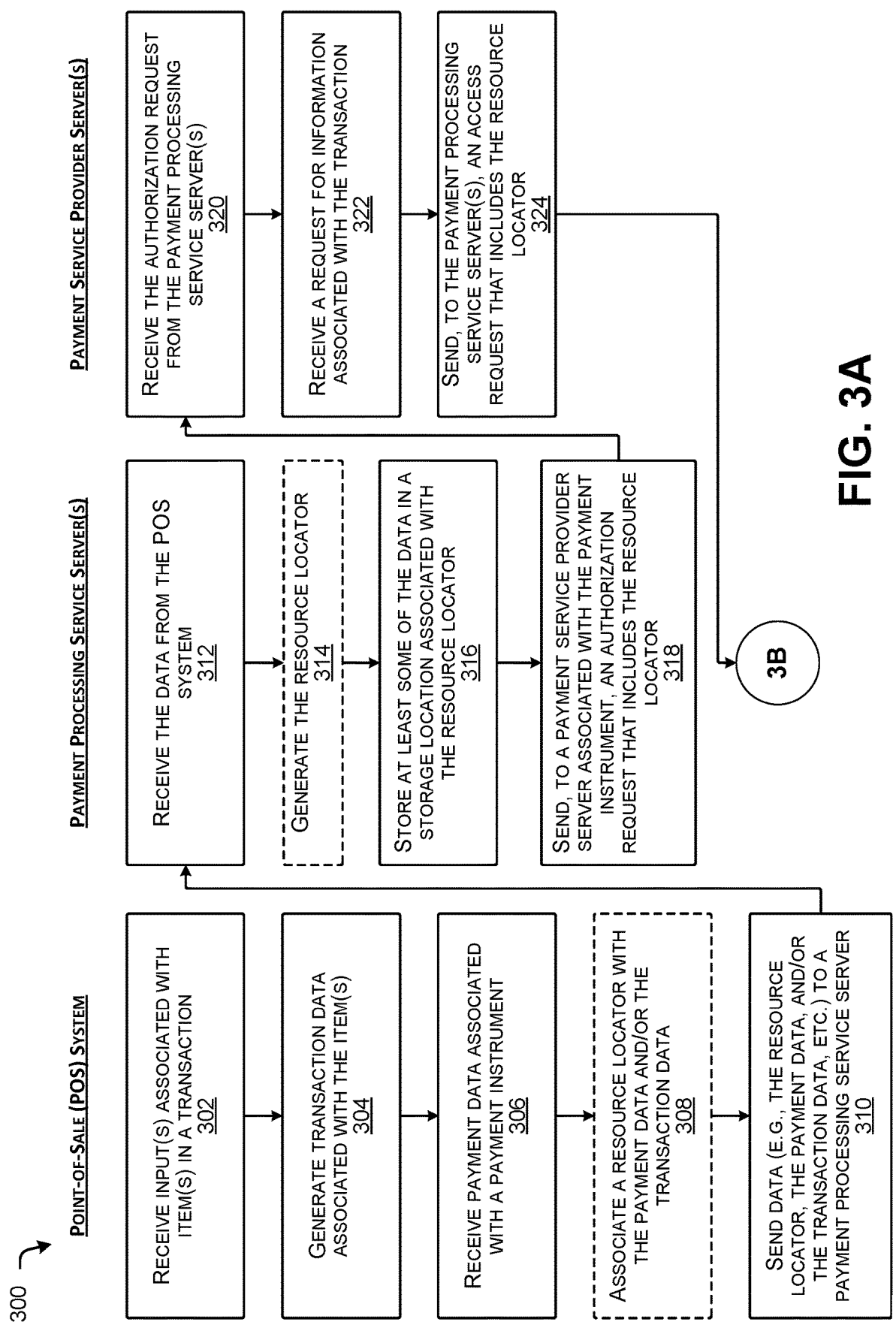

FIGS. 3A-3B depict a non-limiting flow diagram illustrating an example method 300 for providing itemized digital receipts, in accordance with some implementations. In some examples, the method 300 may include one or multiple features, components, and/or functionality of implementations described herein with reference to FIGS. 1, 2, and 4-11. The method 300 and other methods described herein are illustrated as collections of blocks in logical flow diagrams, which represent a sequence of operations, some or all of which can be implemented in hardware, software, or a combination thereof. In the context of software, the blocks may represent computer-executable instructions stored on one or more computer-readable media that, when executed by one or more processors, program the processors to perform operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the method, or alternative methods, and not all of the blocks need to be executed. For discussion purposes, the methods are described with reference to the environments, architectures, and systems described in the examples herein, although the methods may be implemented in a wide variety of other environments, architecture, and systems.

At 302, the method 300 may include receiving input associated with item(s) in a transaction. For instance, a customer may engage in the transaction with a merchant to purchase the item(s). In some examples, the input associated with the item(s) may be received at a merchant device and/or a point-of-sale (POS) system. In some instances, a merchant device may be executing an instance of a merchant application. The merchant application may configure the merchant device as a POS terminal to transmit data to a payment processing service.

At 304, the method 300 may include generating transaction data associated with the item(s). In some non-limiting examples, the transaction data may include item names, item prices, descriptors of the items (e.g., size, flavor, color, etc.), payment data, time of transaction, location of transaction (e.g., geolocation data indicating a geographic location of the transaction), and/or merchant identifier, a merchant category code (MCC), any type of data that is received upon a customer's authentication into a social network, if any, and/or various other types of data.

At 306, the method 300 may include receiving payment data associated with a payment instrument. For instance, the POS system may obtain payment data from payment instruments via swipes, dips, and/or taps in some implementations. A swipe may include a transaction where a customer slides a card having a magnetic strip through a payment reader that captures payment data contained in the magnetic strip. A dip may include a transaction where a customer inserts a card having a chip (e.g., an embedded microchip) into a payment reader chip-side first. The card may remain in the payment reader until the payment reader prompts the customer to remove the card. While the card is in the payment reader, the chip may create a one-time code that is sent from the POS system to a server associated with a payment processing service and/or a payment service provider (e.g., a bank and/or a card payment network, etc.) to be matched with an identical one-time code. A tap may include a transaction where a customer may tap or hover his or her electronic device such as a smart phone running a payment application over a payment reader to complete a transaction via short-range communication (e.g., NFC, RFID, Bluetooth®, BLE, etc.). Short-range communication may enable the electronic device to exchange information with the payment reader of the POS system. A tap may also be called a contactless payment in some cases. In some countries, a customer may engage in a tap using a TAP card instead of an electronic device. Furthermore, in some examples, the POS system may obtain payment data by receiving input (e.g., an identifier) associated with a cryptocurrency account.

At 308, the method 300 may include associating a resource locator (e.g., a URL) with the payment data and/or the transaction data. In some instances, the POS system may generate the resource locator. In other instances, however, the POS system may not generate the resource locator; rather, another computing device (e.g., the payment processing service server(s)) may generate the resource locator in various implementations. The resource locator may be used to obtain data that is stored in a storage location. For instance, the data may be stored in a particular storage location that is associated with the resource locator.

At 310, the method 300 may include sending data to a payment processing service server. For instance, the data may be sent by the POS system. In some examples, the data may include the resource locator, the payment data, and/or the transaction data.

At 312, the method 300 may include receiving the data from the POS system. For instance, the data may be received at the payment processing service server(s).

At 314, the method 300 may include generating the resource locator. As noted above, the resource locator may not be generated by the POS system in some implementations. In such cases, the resource locator may be generated by the payment processing service server(s). The resource locator may be associated with the payment data, the transaction data, and/or the merchant device/POS system in some instances.

At 316, the method 300 may include storing at least some of the data in a storage location associated with the resource locator. For example, the payment processing service server(s) may store the payment data and/or the transaction data in the storage location associated with the resource locator. In some examples, the resource locator may be stored by the payment processing service server(s). Furthermore, the resource locator may enable access retrieval of the payment data and/or the transaction data.

At 318, the method 300 may include sending an authorization request that includes the resource locator. For instance, the payment processing service server(s) may send the authorization request to the payment service provider server(s) to authorize the payment instrument for a cost of the transaction. In some cases, the resource locator may be embedded as metadata in the authorization request. In some implementations, the payment instrument may have been issued by the payment processing service, and thus the payment processing service server(s) may not need to send an authorization request to the payment service provider server(s). In some such cases, the POS system may send an authorization request to the payment processing service server(s), and the authorization request may include, or may be otherwise associated with, the resource locator.

At 320, the method 300 may include receiving the authorization request from the payment processing service server(s). For instance, the authorization request may be received at the payment service provider server(s). The payment service provider server(s) may be configured to look for the resource locator associated with (e.g., embedded in) the authorization request. In some instances, the payment service provider server(s) may store the resource locator for future reference. The payment service provider server(s) may respond to the authorization request received from the payment processing service server(s). For example, the payment service provider server(s) may, at least partly responsive to receiving the authorization request, send the payment processing service server(s) an authorization status that indicates whether the payment instrument is authorized or declined.

At 322, the method 300 may include receiving a request for information associated with the transaction. For example, the payment service provider server(s) may receive, from a customer device operated by the customer in the transaction, a receipt request indicating that the customer would like to receive a receipt.

At 324, the method 300 may include sending an access request that includes or is otherwise associated with the resource locator. In some implementations, the payment service provider server(s) may send the access request to the payment processing service server(s) at least partly responsive to receiving the request for information from the customer device.

At 326, the method 300 may include receiving the access request. For instance, the payment processing service server(s) may receive the access request from the payment server provider server(s). The payment processing service server(s) may be configured to look for the resource locator associated with the access request.

At 328, the method 300 may include generating an itemized digital receipt. For instance, the payment processing service server(s) may access, based at least in part on the resource locator, the transaction data from the storage location, and generate the itemized digital receipt based at least in part on the transaction data. In various implementations, the itemized digital receipt may include item-level information about the transaction. For example, the itemized digital receipt may, among other things, identify each item that the customer purchased via the transaction. In some cases, the item-level information may include an item name, a price, and/or a picture of a respective item. In some instances, the itemized digital receipt may be generated based at least in part on the item-level information.

At 330, the method 300 may include sending the itemized digital receipt. For example, the payment processing service server(s) may send the itemized digital receipt to the customer device (e.g., directly or indirectly). According to some examples, the itemized digital receipt may be operable to enable the customer to interact with individual items in the itemized digital receipt via a user interface associated with the customer device. In some examples, the itemized digital receipt may enable the customer to interact with the itemized digital receipt to provide, e.g., feedback, loyalty information, and/or a gratuity. Furthermore, in some cases, the itemized digital receipt may enable the customer to interact with the itemized digital receipt to dispute a charge.

Figure 4:
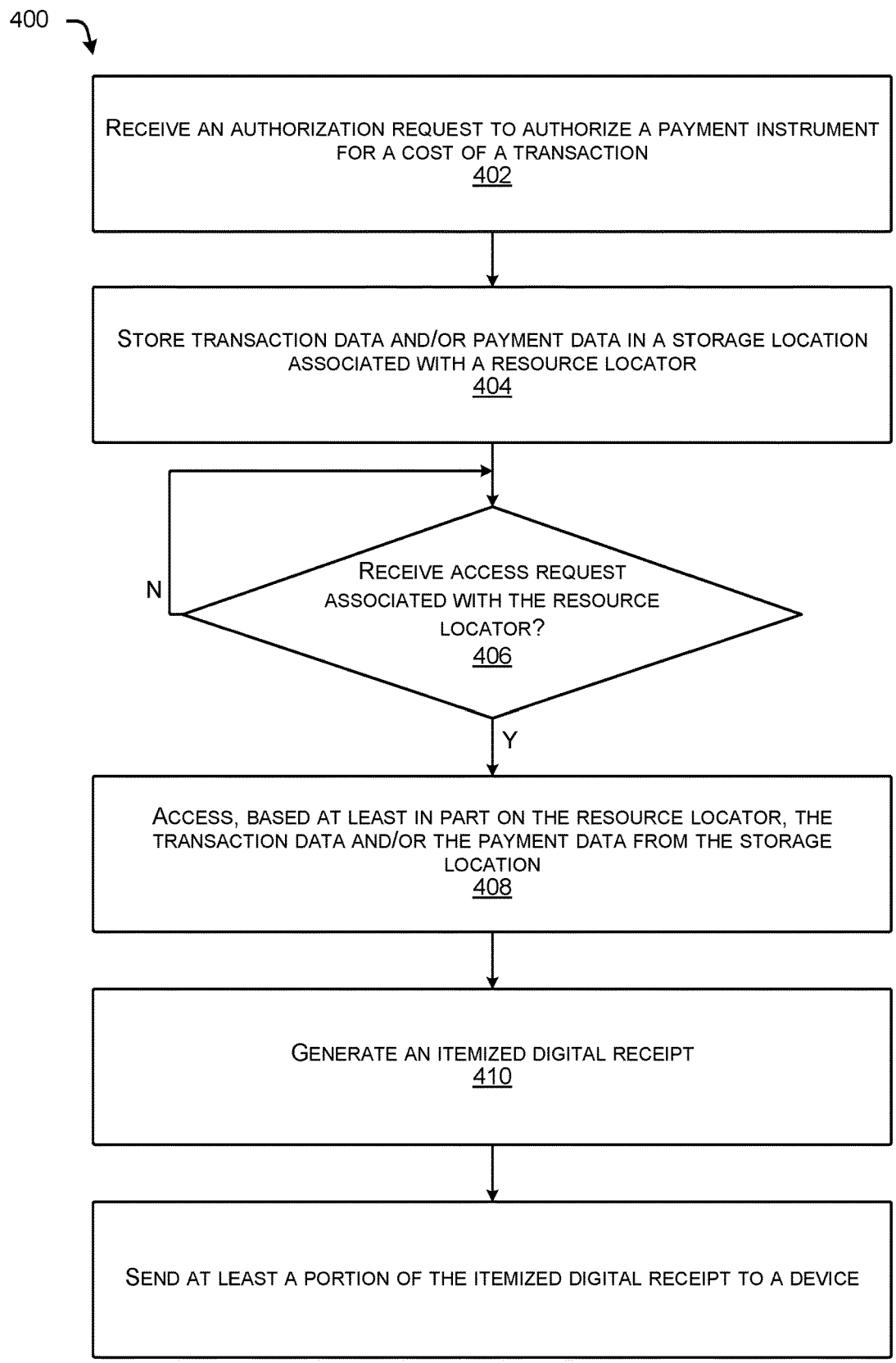
FIG. 4 depicts a non-limiting flow diagram illustrating another example method for providing itemized digital receipts, in accordance with some implementations.

FIG. 4 depicts a non-limiting flow diagram illustrating another example method 400 for providing itemized digital receipts, in accordance with some implementations. In some examples, the method 400 may include one or multiple features, components, and/or functionality of implementations described herein with reference to FIGS. 1-3B and 5-11.

At 402, the method 400 may include receiving an authorization request to authorize a payment instrument for a cost of a transaction. For instance, a payment processing service server may receive the authorization request from a merchant device/POS system. In some instances, the authorization request may be associated with a resource locator associated with transaction data and/or payment data of the transaction. For example, as discussed above, the POS system may generate the resource locator in some implementations.

At 404, the method 400 may include storing transaction data and/or payment data in a storage location associated with a resource locator. As discussed above, the resource locator may be generated by the POS system in some instances. In other instances, the resource locator may be generated by the payment processing service server. The payment processing server may store transaction data and/or the payment data in the storage location associated with the resource locator. The resource locator may enable access retrieval of the data stored in the storage location.

In some implementations, the payment processing server may send, to a payment service provider server, an authorization request to authorize the payment instrument for the cost of the transaction. The authorization request may be associated with the resource locator. For example, the resource locator may be embedded as metadata in the authorization request.

At 406, the method 400 may include determining whether an access request associated with the resource locator has been received. If at 406 it is determined that an access request associated with the resource locator has not been received, then the method 400 may proceed to continually or periodically check whether an access request has been received (at 406). If, on the other hand, at 406 it is determined that an access request associated with the resource locator has been received, then the method 400 may include accessing, based at least in part on the resource locator, the transaction data and/or the payment data from the storage location (at 408). At 410, the method 400 may include generating an itemized digital receipt. In some implementations, generating the itemize digital receipt may include generating a computer-readable specification. The computer-readable specification may include, for instance, merchant data associated with the merchant, location data associated with the transaction, the cost of the transaction, and/or transaction data associated with individual items of the transaction. In some instances, the itemized digital receipt may be generated at least partly responsive to receiving the access request.

At 412, the method 400 may include sending at least a portion of the itemized digital receipt to a device. For example, the payment processing service server may send the itemized digital receipt to a customer device (e.g., directly or indirectly). In some instances, the itemized digital receipt may be sent at least partly responsive to receiving the access request. In some instances, the payment processing service server may push the itemized digital receipt to the customer device, e.g., via a push notification, a text message, and/or an e-mail, etc.

Figure 5:
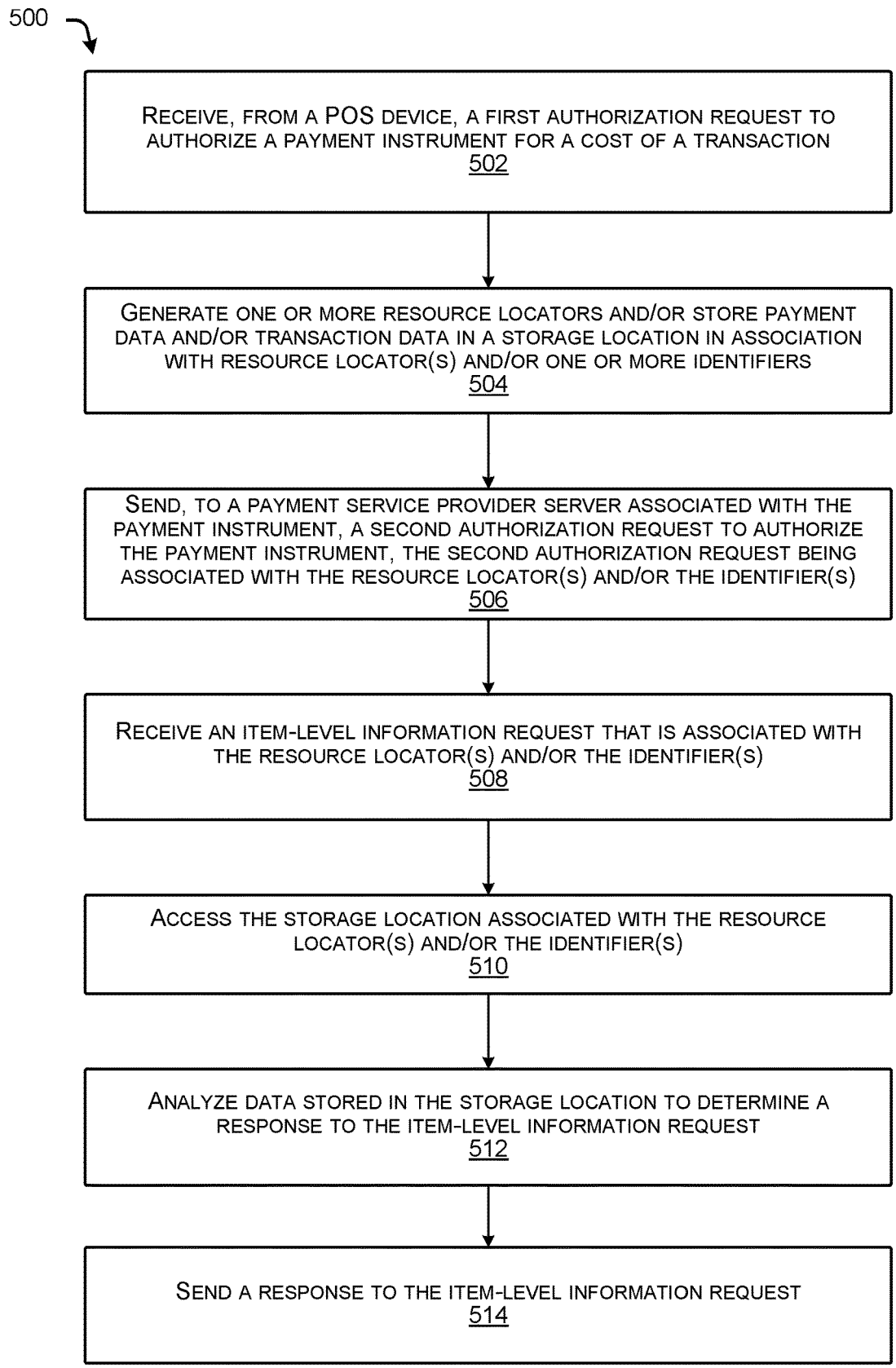
FIG. 5 depicts a non-limiting flow diagram illustrating an example method for responding to an item-level information request, in accordance with some implementations.

FIG. 5 depicts a non-limiting flow diagram illustrating an example method 500 for responding to an item-level information request, in accordance with some implementations. In some examples, the method 500 may include one or multiple features, components, and/or functionality of implementations described herein with reference to FIGS. 1-4 and 6-11.

At 502, the method 500 may include receiving, from a point-of-sale (POS) device, a first authorization request to authorize a payment instrument for a cost of a transaction (e.g., a first transaction) between a merchant and a customer. For instance, the first authorization request may be received at a payment processing service server in some implementations.

At 504, the method 500 may include generating one or more resource locators and/or storing payment data and/or transaction data in a storage location in association with one or more resource locators and/or one or more identifiers (e.g., a customer identifier). For instance, the generating and/or the storing may be performed by the payment processing service server. In some cases, the payment processing service server may store the payment data and/or the transaction data in the storage location and generate a resource locator (e.g., a random URL, a sequential URL, etc.) to be associated with the storage location. According to some implementations, the payment processing service server may generate the resource locator and store the data substantially contemporaneously. In some instances, the payment processing service server may generate the resource locator before or after it stores the data. For example, the payment processing service server may generate the resource locator based at least in part on the payment data and/or the transaction data, and may include the resource locator in the storage location such that the data set in the storage location includes, e.g., payment data, transaction data, a customer identifier, a merchant identifier, the resource locator, etc. In some examples, the storage location may include transaction data from at least one other transaction (e.g., a second transaction). In some examples, the second transaction may be between the customer and the same merchant as in the first transaction. However, in some examples the second transaction may be between the customer and a different merchant. According to some cases, the first transaction may occur during a first time period, and the second transaction may occur during a second time period that is different (e.g., after) the first time period.

At 506, the method 500 may include sending, to a payment service provider server associated with the payment instrument, a second authorization request to authorize the payment instrument. For instance, the payment processing service server may send the second authorization request to the payment service provider server. In some examples, the second authorization request may be associated with the resource locator(s) and/or the identifier(s). For instance, the resource locator(s) and/or the identifier(s) may be embedded as metadata in the second authorization request. Furthermore, the first authorization request received from the POS device (at 502) may be associated with the resource locator (s) and/or the identifier(s) in some implementations. For instance, the resource locator(s) and/or the identifier(s) may be embedded as metadata in the first authorization request.

At 508, the method 500 may include receiving an item-level information request that is associated with the resource locator(s) and/or the identifier(s). For instance, the payment processing service server may receive the item-level information request from the payment service provider server. At 510, the method 500 may include accessing the storage location associated with the resource locator(s) and/or the identifier(s). For instance, the payment processing service server(s) may access the storage location using the resource locator(s) and/or the identifier(s) received in the item-level information request.

At 512, the method 500 may include analyzing data stored in the storage location to determine a response to the item-level information request. For instance, the payment processing service server(s) may analyze at least the first transaction data and the second transaction data stored in the storage location associated with the resource locator.

In some examples, the item-level information request may be associated with a particular merchant, an item type, and/or an item class, etc. Analyzing the transaction data (e.g., the first transaction data and the second transaction data) may include, for example, identifying a subset of items from item(s) of the first transaction and/or item(s) of the second transaction that were purchased from the particular merchant, are of the item type, and/or are associated with the item class, etc. A response to the item-level information request may be generated based at least in part on the identified subset of items.

At 514, the method 500 may include sending a response to the item-level information request. For instance, the payment processing service server may send the response to the item-level information request to a customer device operated by the customer. The response to the item-level information request may include item-level information based at least in part on the item-level information requested and/or based at least in part on the analysis of the first transaction data and the second transaction data, e.g., as discussed above with reference to FIG. 2.

Figure 6:
FIG. 6 depicts an example user interface (UI) that includes an itemized digital receipt, in accordance with some implementations.

FIG. 6 depicts an example user interface (UI) 600 that includes an itemized digital receipt, in accordance with some implementations. For instance, the UI 600 may be presented via a display of a customer device in some implementations. In some examples, the UI 600 may include one or multiple features, components, and/or functionality of implementations described herein with reference to FIGS. 1-5 and 7-11.

According to various examples, the itemized digital receipt presented via the UI 600 may include various item-level information of a transaction. As indicated in FIG. 6, the itemized digital receipt may show a merchant logo, a merchant name, a merchant address, a total cost of the transaction (e.g., "$10.23"), a date and/or time of the transaction (e.g., "October 18 at 1:09 PM"), item name(s) (e.g., "Item A", "Item B", etc.), item price(s) (e.g., "$4.54", "$3.99", etc.), item modifiers (if applicable), a subtotal (e.g., "$8.53"), sales tax (e.g., "8.5%", "$0.70", etc.), a tip (e.g., "$1.00"), and/or a customer experience feedback portion (e.g., "How was your experience?" with a happy face and a sad face graphical element to provide customer experience feedback), etc. It should be understood that this example UI 600 is not intended to provide an exhaustive list of types of item-level information—any other suitable type of item-level information may be provided in the itemized digital receipt.

In some examples, the itemized digital receipt may be operable to enable a customer to interact with individual items in the itemized digital receipt. For instance, the customer may interact with item-level information in the itemized digital receipt via the UI 600. In some non-limiting examples, the itemized digital receipt may enable the customer to interact with the itemized digital receipt to dispute a charge, provide feedback, provide loyalty information, and/or add or modify a gratuity, etc. In some cases, the payment processing service server may receive an indication of the interaction. Additionally, or alternatively, the payment processing service server may receive interaction data, e.g., data from user input in the interaction. In some instances, the payment processing service server may update, based at least in part on the interaction data, the transaction data and/or the payment data stored in the storage location associated with the resource locator.

Figure 7:
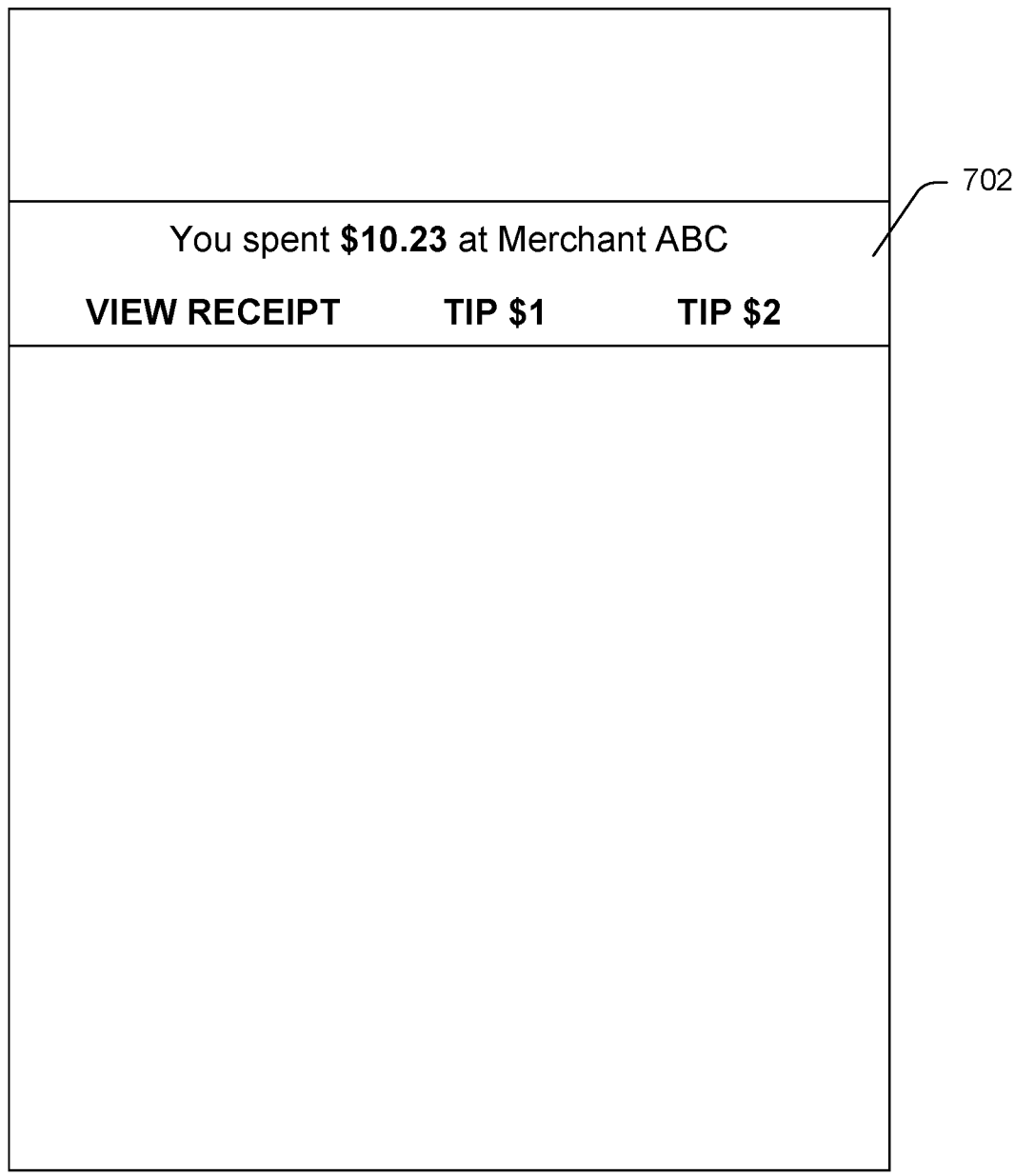
FIG. 7 depicts an example UI that includes a notification associated with an itemized digital receipt, in accordance with some implementations.

FIG. 7 depicts an example UI 700 that includes a notification 702 associated with an itemized digital receipt, in accordance with some implementations. For instance, the UI 700 may be presented via a display of a customer device in some implementations. In some examples, the UI 700 may include one or multiple features, components, and/or functionality of implementations described herein with reference to FIGS. 1-6 and 8-11.

In some implementations, the notification 702 may be a push and/or a pop-up notification that is presented via the UI 700, e.g., at least partly responsive to having initiated and/or completed a transaction with a merchant. According to some examples, the notification 702 may be sent to the customer device by a payment processing service server, a payment service provider server, a merchant device, and/or a payments application (e.g., an application associated with a card or other payment instrument issued by a card network, a bank, the payment processing service, the payment service provider, and/or the merchant, etc.) In the non-limiting example shown in FIG. 7, the notification 702 indicates that the customer spent $10.23 at Merchant ABC. Furthermore, the notification 702 may enable the customer to view a receipt (e.g., an itemized digital receipt) for the transaction. The notification 702 may enable the customer to add a tip (e.g., a tip of $1, $2, etc.). In some instances, the customer may have been particularly satisfied with the service at Merchant ABC, and the notification 702 may provide the opportunity to add a tip after receiving the service in addition to, or as an alternative to, adding a tip at the merchant POS system before receiving the service. It should be understood that this example UI 700 is not intended to provide an exhaustive list of types of information that may be provided in the notification 702—any other suitable type of information may be provided in the notification 702.

Figure 8:
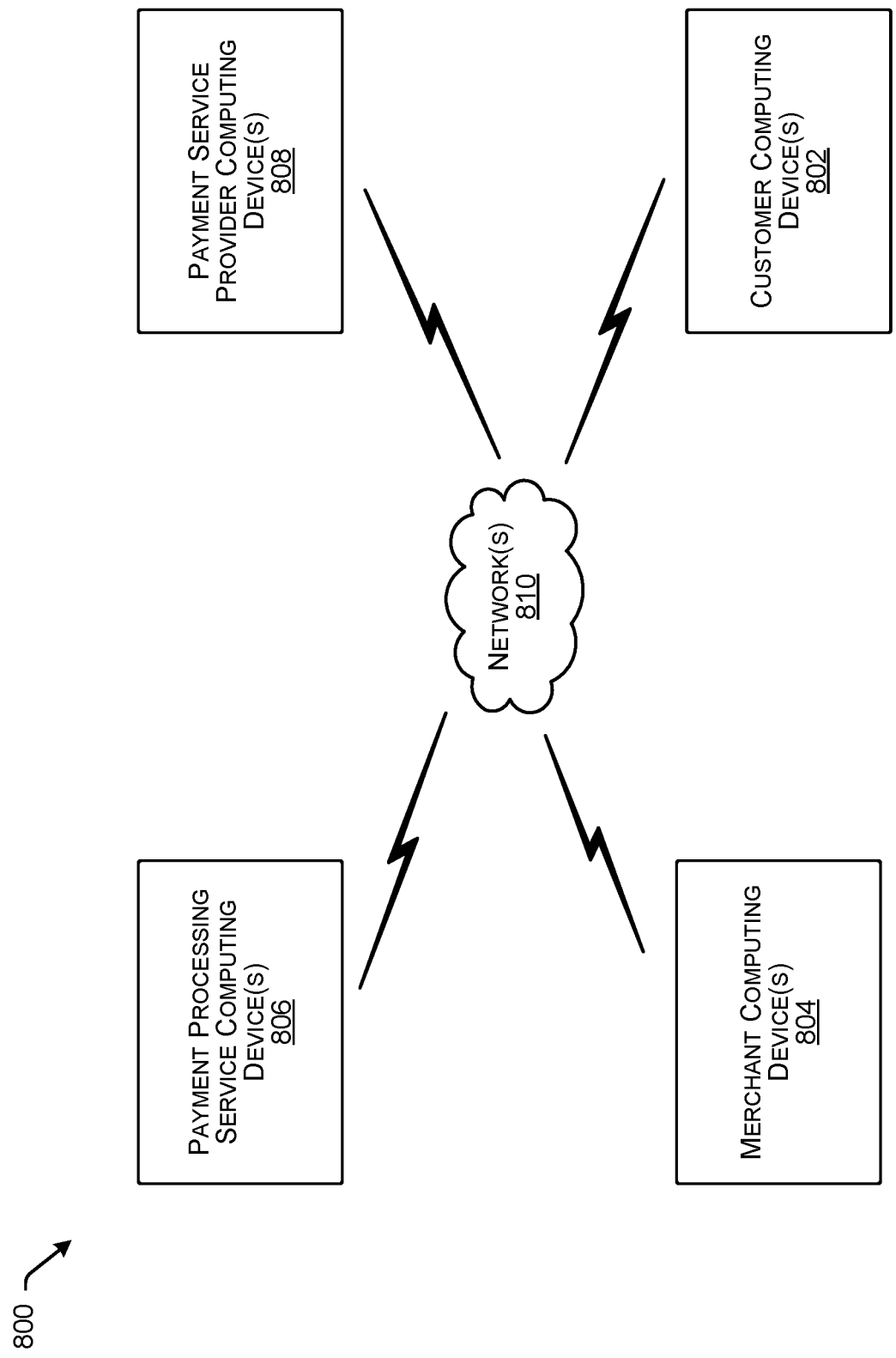
FIG. 8 depicts an illustrative block diagram of an example payment system that may be used to implement itemized digital receipts, in accordance with some implementations.

FIG. 8 depicts an illustrative block diagram of an example payment system 800 that may be used to implement itemized digital receipts, in accordance with some implementations. In some examples, the payment system 800 may include one or multiple features, components, and/or functionality of implementations described herein with reference to FIGS. 1-7 and 9-11.

In some examples, the payment system 800 may include customer computing device(s) 802 (e.g., customer device 102 of FIG. 1), merchant computing device(s) 804 (e.g., merchant device(s)/POS system 104 of FIG. 1), payment processing service computing device(s) 806 (e.g., payment processing service server(s) 106 of FIG. 1), and/or payment service provider computing device(s) 808 (e.g., payment service provider server(s) 108 of FIG. 1), which may communicate over network(s) 810, e.g., to provide and/or receive various information/data. In some examples, one or more computing devices of the payment system 800 may communicate with one or more other devices of the payment system 800 through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Figure 9:
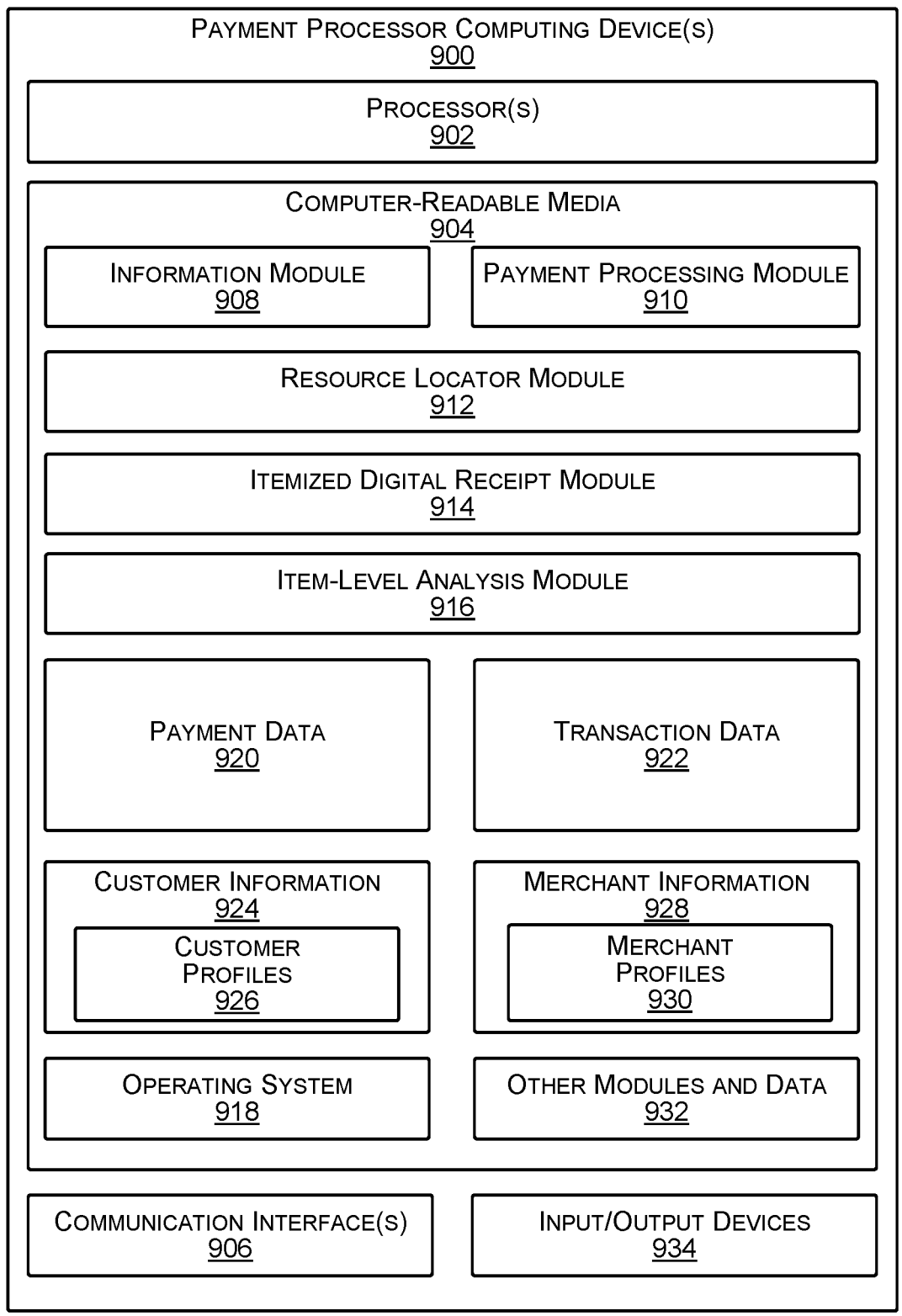
FIG. 9 depicts an illustrative block diagram of select components of an example payment processing service computing device, in accordance with some implementations.

FIG. 9 depicts an illustrative block diagram of select components of an example payment processing service computing device 900, in accordance with some implementations. In some examples, the payment processing service computing device 900 may include one or multiple features, components, and/or functionality of implementations described herein with reference to FIGS. 1-8, 10, and 11.

In some examples, the payment processing service computing device 900 may be operated by a payment processing service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while FIG. 9 illustrates the components and data of the payment processing service computing device 900 as being present in a single location, these components and data may alternatively be distributed across different computing devices and different locations in any manner. Consequently, the functions may be implemented by one or more payment processing service computing devices 900, with the various functionality described above distributed in various ways across the different computing devices. Multiple payment processing service computing devices 900 may be located together or separately, and organized, for example, as virtual servers, server banks and/or server farms. The described functionality may be provided by the servers of a single entity or enterprise, or may be provided by the servers and/or services of multiple different buyers/customer or enterprises.

In the illustrated example, each payment processing service computing device 900 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the payment processing service computing device 900, the computer-readable media 904 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to payment processing service server(s) and/or payment processing service computing device(s). Functional components stored in the computer-readable media 904 may include an information module 908, a payment processing module 910, a resource locator module 912, an itemized digital receipt module 914, and/or an item-level analysis module 916. Additional functional components stored in the computer-readable media 904 may include an operating system 918 for controlling and managing various functions of the payment processing service computing device 900.

In some implementations, the information module 908 may enable the payment processing service computing device 900 to, among other things, access, receive, send, track, parse, and/or store (or otherwise manage the storage of) information, such as transaction data and/or payment data.

In some examples, the payment processing module 910 may enable the payment processing service computing device 900 to, among other things, process payments for one or more merchants. For instance, the payment processing module 910 may provide the functionality for processing payments for multiple different merchants.

According to various examples, the resource locator module 912 may enable the payment processing service computing device 900 to, among other things, generate a resource locator and/or associate the resource locator with a storage location.

In some cases, the itemized digital receipt module 914 may enable the payment processing service computing device 900 to, among other things, generate an itemized digital receipt and/or provide the itemized digital receipt to another device (e.g., a customer device, a payment service provider device, a merchant device, etc.).

In some implementations, the item-level analysis module 916 may enable the payment processing service computing device 900 to, among other things, analyze item-level information and/or respond to an item-level information request.

In addition, the computer-readable media 904 may store data used for performing the operations described herein. For instance, the computer-readable media 904 may store payment data 920, transaction data 922, customer information 924 (e.g., including customer profiles 926), and/or merchant information 928 (e.g., including merchant profiles 930). The payment processing service computing device 900 may also include or maintain other functional components and data, such as other modules and data 932, which may include programs, drivers, etc., and the data used or generated by the functional components. Further, the payment processing service computing device 900 may include many other logical, programmatic and physical components, of which those described above are merely examples that are related to the discussion herein.

The communication interface(s) 906 may include one or more interfaces and hardware components for enabling communication with various other devices, such as over the network(s) 810 of FIG. 8. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The payment processing service computing device 900 may further be equipped with various input/output (I/O) devices 934. Such I/O devices 934 may include a display, various user interface controls (e.g., buttons, joystick, keyboard, mouse, touch screen, etc.), audio speakers, connection ports and so forth.

Figure 10:
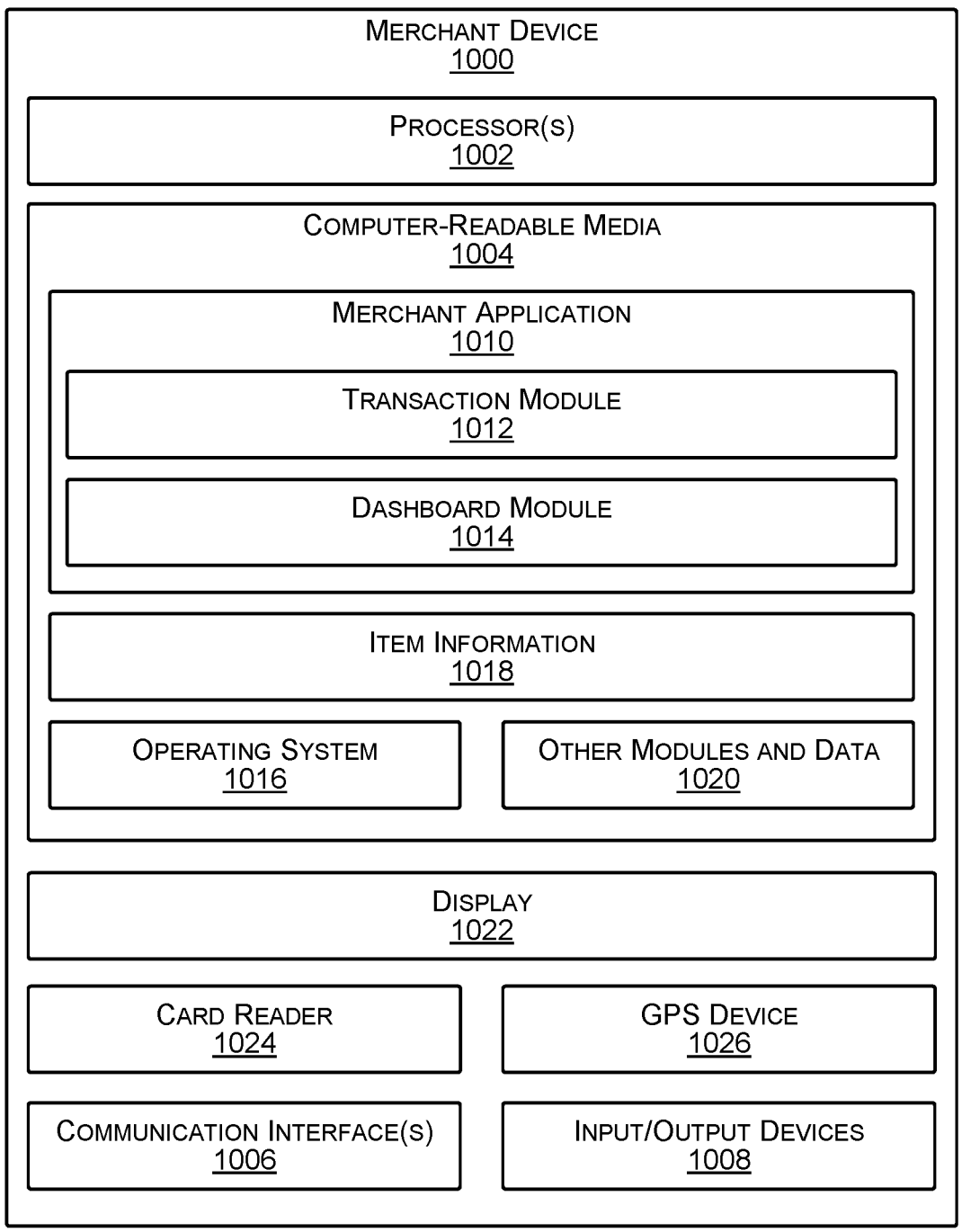
FIG. 10 depicts an illustrative block diagram of select components of an example merchant computing device, in accordance with some implementations.

FIG. 10 depicts an illustrative block diagram of select components of an example merchant computing device 1000, in accordance with some implementations. In some examples, the merchant computing device 1000 may include one or multiple features, components, and/or functionality of implementations described herein with reference to FIGS. 1-9 and 11. The merchant computing device 1000 may be any suitable type of computing device, e.g., portable, semi-portable, semi-stationary, or stationary. Some examples of the merchant computing device 1000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device 1000 includes at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the merchant computing device 1000, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, the merchant computing device 1000 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the merchant computing device 1000. Functional components of the merchant computing device 1000 stored in the computer-readable media 1004 may include a merchant application 1010. In this example, the merchant application 1010 includes a transaction module 1012 and a dashboard module 1014. For example, the transaction module 1012 may present an interface, such as a payment interface to enable the merchant to conduct transactions, receive payments, and so forth, as well as for communicating with one or more payment processing service computing devices for processing payments and sending transaction data. Further, the dashboard module 1014 may present a setup interface to enable the merchant to setup items, such as for adding new items or modifying information for existing items. The dashboard module 1014 may further enable the merchant to manage the merchant's account, the merchant profile, merchant preferences, view saved or new information, and the like. Additional functional components may include an operating system 1016 for controlling and managing various functions of the merchant computing device 1000 and for enabling basic user interactions with the merchant computing device 1000.

In addition, the computer-readable media 1004 may also store data, data structures and the like, that are used by the functional components. For example, data stored by the computer-readable media 1004 may include item information 1018 that includes information about the items offered by the merchant, which may include a list of items currently available from the merchant, images of the items, descriptions of the items, prices of the items, and so forth. Depending on the type of the merchant computing device 1000, the computer-readable media 1004 may also optionally include other functional components and data, such as other modules and data 1020, which may include programs, drivers, etc., and the data used or generated by the functional components. Further, the merchant computing device 1000 may include many other logical, programmatic and physical components, of which those described are merely examples that are related to the discussion herein.

The communication interface(s) 1006 may include one or more interfaces and hardware components for enabling communication with various other devices, such as over the network(s) 810 of FIG. 8, or directly. For example, communication interface(s) 1006 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 10 further illustrates that the merchant computing device 1000 may include a display 1022 mentioned above. Depending on the type of computing device used as the merchant computing device 1000, the display 1022 may employ any suitable display technology. For example, the display 1022 may be a liquid crystal display, a plasma display, a light-emitting diode display, an OLED (organic light-emitting diode) display, an electronic paper display, or any other suitable type of display able to present digital content thereon. In some examples, the display 1022 may have a touch sensor associated with the display 1022 to provide a touchscreen display configured to receive touch inputs for enabling interaction with a graphic interface presented on the display 1022. Accordingly, implementations herein are not limited to any particular display technology. Alternatively, in some examples, the merchant computing device 1000 may not include the display 1022, and information may be presented by other means, such as aurally.

The merchant computing device 1000 may further include the one or more I/O devices 1008. The I/O devices 1008 may include speakers, a microphone, a camera, and various user controls (e.g., buttons, a joystick, a keyboard, a keypad, etc.), a haptic output device, and so forth.

In addition, the merchant computing device 1000 may include or may be connectable to a card reader 1024. In some examples, the card reader 1024 may plug in to a port in the merchant computing device 1000, such as a microphone/headphone port, a data port, or other suitable port. The card reader 1024 may include a read head for reading a magnetic strip of a payment card, and further may include encryption technology for encrypting the information read from the magnetic strip. Alternatively, numerous other types of card readers 1024 may be employed with the merchant computing devices herein, depending on the type and configuration of the merchant computing device 1000.

Other components included in the merchant computing device 1000 may include various types of sensors, which may include a GPS device 1026 able to indicate location information, as well as other sensors (not shown) such as an accelerometer, gyroscope, compass, proximity sensor, and the like. Additionally, the merchant computing device 1000 may include various other components that are not shown, examples of which include removable storage, a power source, such as a battery and power control unit, and so forth.

Figure 11:
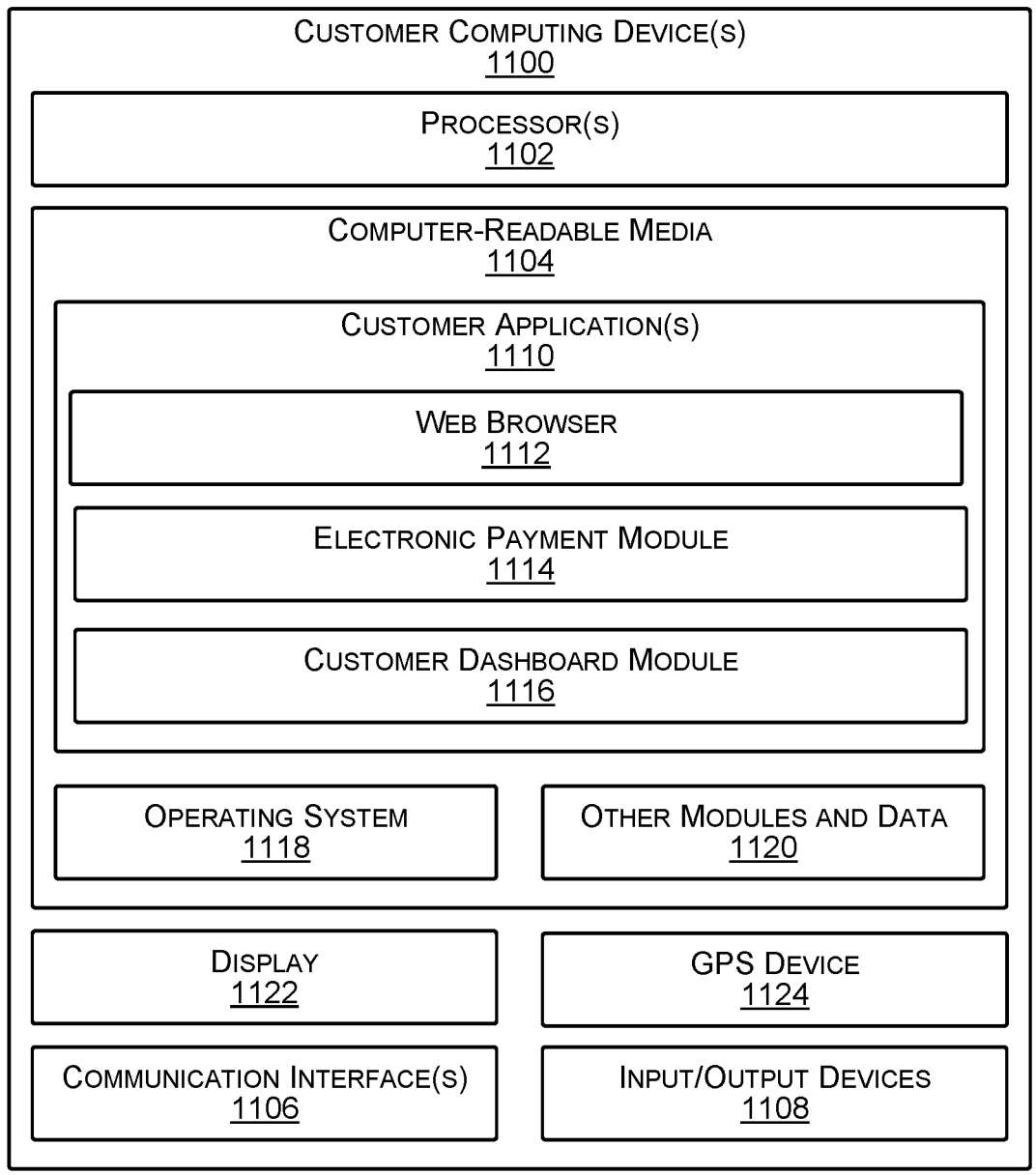
FIG. 11 depicts an illustrative block diagram of select components of an example customer computing device, in accordance with some implementations.

FIG. 11 depicts an illustrative block diagram of select components of an example customer computing device 1100, in accordance with some implementations. In some examples, the customer computing device 1100 may include one or multiple features, components, and/or functionality of implementations described herein with reference to FIGS. 1-10. The customer computing device 1100 may be any of a number of different types of computing devices, including portable computing devices. Some examples of the customer computing device 1100 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 11, the customer computing device 1100 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the customer computing device 1100, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1104 may include, but is not limited to, RAM, ROM, EEPROM, flash memory, solid-state storage, magnetic disk storage, optical storage, and/or other computer-readable media technology. Further, in some cases, the customer computing device 1100 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the customer computing device 1100. Functional components of the customer computing device 1100 stored in the computer-readable media 1104 may include customer application(s) 1110. In this example, the customer applications 1110 include a web browser 1112, an electronic payment module 1114 that provides functionality allowing the customer to make electronic payments, and a customer dashboard module 1116. For example, the customer dashboard module 1116 may present the customer with an interface for managing the customer's account, changing information, changing preferences, and so forth. Additional functional components may include an operating system 1118 for controlling and managing various functions of the customer computing device 1100 and for enabling basic user interactions with the customer computing device 1100.

In addition, the computer-readable media 1104 may also store data, data structures, and the like, that are used by the functional components. Depending on the type of the customer device 1100, the computer-readable media 1104 may also optionally include other functional components and data, such as other modules and data 1120, which may include applications, programs, drivers, etc., and the data used or generated by the functional components. Further, the customer computing device 1100 may include many other logical, programmatic and physical components, of which those described are merely examples that are related to the discussion herein.

The communication interface(s) 1106 may include one or more interfaces and hardware components for enabling communication with various other devices, such as over the network(s) 810 of FIG. 8, or directly. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 11 further illustrates that the customer computing device 1100 may include a display 1122. Depending on the type of computing device used as the customer computing device 1100, the display 1122 may employ any suitable display technology. For example, the display 1122 may be a liquid crystal display, a plasma display, a light-emitting diode display, an OLED (organic light-emitting diode) display, an electronic paper display, or any other suitable type of display able to present digital content thereon. In some examples, the display 1122 may have a touch sensor associated with the display 1122 to provide a touchscreen display configured to receive touch inputs for enabling interaction with a graphic interface presented on the display 1122. Accordingly, implementations herein are not limited to any particular display technology. Alternatively, in some examples, the customer computing device 1100 may not include a display.

The customer computing device 1100 may further include the one or more I/O devices 1108. The I/O devices 1108 may include speakers, a microphone, a camera, and various user controls (e.g., buttons, a joystick, a keyboard, a keypad, etc.), a haptic output device, and so forth.

Other components included in the customer computing device 1100 may include various types of sensors, which may include a GPS device 1124 able to indicate location information, as well as other sensors (not shown) such as an accelerometer, gyroscope, compass, proximity sensor, and the like. Additionally, the customer computing device 1100 may include various other components that are not shown, examples of which include removable storage, a power source, such as a battery and power control unit, and so forth.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
monitoring transaction data associated with a plurality of transactions between customers and merchants;
storing the transaction data associated with the plurality of transactions within a database of a payment processing service system, wherein transaction data associated with a customer of the customers is stored at a particular storage location within the database, wherein the particular storage location is associated with a customer identifier of the customer, and wherein the particular storage location is, at least partially, accessible via a resource locator unique to the customer;
receiving a first request associated with purchase activity of the customer, wherein the first request specifies a time period and one or more transaction characteristics;
determining that the first request is associated with the customer identifier;
based at least in part on the customer identifier and the transaction data associated with the customer and stored in the database, identifying one or more purchase transactions of the customer occurring within the time period and including the one or more transaction characteristics;
presenting, via an application executing on a customer device of the customer, information associated with at least one purchase transaction of the one or more purchase transactions; and
receiving, from the customer device and based at least in part on user interaction with the information, a second request associated with at least one transaction of the one or more purchase transactions, wherein the second request includes the customer identifier and facilitates a customer action with regard to the at least one transaction.

2. The method of claim 1, wherein a transaction characteristic of the one or more transaction characteristics comprises a merchant category.

3. The method of claim 2, further comprising determining the merchant category based at least in part on a merchant category code (MCC).

4. The method of claim 1, wherein a transaction characteristic of the one or more transaction characteristics comprises at least one of:
item type of one or more items;
a price of at least one item of the one or more items;
a total amount;
a descriptor of at least one of the one or more items;
a time;
a location; or
a merchant identifier.

5. The method of claim 1, wherein the time period is a historical time period or a future time period.

6. The method of claim 1, wherein receiving the first request comprises receiving the first request via the customer device.

7. The method of claim 1, wherein identifying the one or more purchase transactions comprises identifying, by one or more servers of the payment processing service system, the one or more purchase transactions based at least in part on the resource locator.

8. The method of claim 1, wherein receiving the first request comprises receiving, by one or more servers of the payment processing service system, the first request from one or more servers of a payment service provider.

9. The method of claim 1, further comprising:
providing instances of a merchant application to point-of-sale (POS) devices of the merchants, wherein an instance of the merchant application configures a respective POS device of the POS devices to communicate, via one or more networks, with one or more servers of the payment processing service system to process at least one transaction of the plurality of transactions; and
receiving, from at least one POS device of the POS devices via one or more corresponding instances of the merchant application, at least a portion of the transaction data associated with the plurality of transactions,
wherein monitoring the transaction data associated with the plurality of transactions comprises receiving the at least the portion of the transaction data associated with the plurality of transactions from the POS devices via the instances of the merchant application.

10. The method of claim 9, further comprising:
processing, by the payment processing service system, individual transactions of the plurality of transactions.

11. One or more non-transitory computer-readable media that, when executed by one or more processors, cause the one or more processors to perform operations comprising:
monitoring transaction data associated with a plurality of transactions between customers and merchants;
storing the transaction data associated with the plurality of transactions within a database of a payment processing service system, wherein transaction data associated with a customer of the customers is stored at a particular storage location within the database, wherein the particular storage location is associated with a customer identifier of the customer, and wherein the particular storage location is, at least partially, accessible via a resource locator unique to the customer;
receiving a first request associated with purchase activity of the customer, wherein the first request specifies a time period and one or more transaction characteristics;
determining that the first request is associated with the customer identifier;
based at least in part on the customer identifier and the transaction data associated with the customer and stored in the database, identifying one or more purchase transactions of the customer occurring within the time period and including the one or more transaction characteristics;
presenting, via an application executing on a customer device of the customer, information associated with at least one purchase transaction of the one or more purchase transactions; and
receiving, from the customer device and based at least in part on user interaction with the information, a second request associated with at least one transaction of the one or more purchase transactions, wherein the second request includes the customer identifier and facilitates a customer action with regard to the at least one transaction.

12. The one or more non-transitory computer-readable media of claim 11, wherein a transaction characteristic of the one or more transaction characteristics comprises a merchant category.

13. The one or more non-transitory computer-readable media of claim 12, the operations further comprising determining the merchant category based at least in part on a merchant category code (MCC).

14. The one or more non-transitory computer-readable media of claim 11, wherein a transaction characteristic of the one or more transaction characteristics comprises at least one of:
- item type of one or more items;
- a price of at least one item of the one or more items;
- a total amount;
- a descriptor of at least one of the one or more items;
- a time;
- a location; or
- a merchant identifier.

15. The one or more non-transitory computer-readable media of claim 11, wherein identifying the one or more purchase transactions comprises identifying, by one or more servers of the payment processing service system, the one or more purchase transactions based at least in part on the resource locator.

16. The one or more non-transitory computer-readable media of claim 11, the operations further comprising:
- providing instances of a merchant application to point-of-sale (POS) devices of the merchants, wherein an instance of the merchant application configures a respective POS device of the POS devices to communicate, via one or more networks, with one or more servers of the payment processing service system to process at least one transaction of the plurality of transactions; and
- receiving, from at least one POS device of the POS devices via one or more corresponding instances of the merchant application, at least a portion of the transaction data associated with the plurality of transactions, wherein monitoring the transaction data associated with the plurality of transactions comprises receiving the at least the portion of the transaction data associated with the plurality of transactions from the POS devices via the instances of the merchant application.

17. The one or more non-transitory computer-readable media of claim 16, the operations further comprising:
- processing, by the payment processing service system, individual transactions of the plurality of transactions.

18. A system comprising:
- one or more processors; and
- one or more non-transitory computer-readable media storing instructions executable by the one or more processors, wherein the instructions cause the one or more processors to perform operations comprising:
  - monitoring transaction data associated with a plurality of transactions between customers and merchants;
  - storing the transaction data associated with the plurality of transactions within a database of a payment processing service system, wherein transaction data associated with a customer of the customers is stored at a particular storage location within the database, wherein the particular storage location is associated with a customer identifier of the customer, and wherein the particular storage location is, at least partially, accessible via a resource locator unique to the customer;
  - receiving a first request associated with purchase activity of the customer, wherein the first request specifies a time period and one or more transaction characteristics;
  - determining that the first request is associated with the customer identifier;
  - based at least in part on the customer identifier and the transaction data associated with the customer and stored in the database, identifying one or more purchase transactions of the customer occurring within the time period and including the one or more transaction characteristics;
  - presenting, via an application executing on a customer device of the customer, information associated with at least one purchase transaction of the one or more purchase transactions; and
  - receiving, from the customer device and based at least in part on user interaction with the information, a second request associated with at least one transaction of the one or more purchase transactions, wherein the second request includes the customer identifier and facilitates a customer action with regard to the at least one transaction.

19. The system of claim 18, the operations further comprising:
- providing instances of a merchant application to point-of-sale (POS) devices of the merchants, wherein an instance of the merchant application configures a respective POS device of the POS devices to communicate, via one or more networks, with one or more servers of the payment processing service system to process at least one transaction of the plurality of transactions; and
- receiving, from at least one POS device of the POS devices via one or more corresponding instances of the merchant application, at least a portion of the transaction data associated with the plurality of transactions, wherein monitoring the transaction data associated with the plurality of transactions comprises receiving the at least the portion of the transaction data associated with the plurality of transactions from the devices via the instances of the merchant application.

20. The system of claim 18, wherein the customer action with regard to the at least one transaction comprises at least one of:
- disputing a charge associated with the at least one transaction;
- providing feedback associated with the at least one transaction;
- providing loyalty information applicable to the at least one transaction; or
- adding or modifying a gratuity for the at least one transaction.

* * * * *